United States Patent [19]

Groat

[11] Patent Number: 4,892,002
[45] Date of Patent: Jan. 9, 1990

[54] ARTICULATED STEERING DRIVESHAFT

[75] Inventor: John L. Groat, Canton, Mich.

[73] Assignee: Ford Motor Company, Dearborn, Mich.

[21] Appl. No.: 228,206

[22] Filed: Aug. 4, 1988

[51] Int. Cl.$^4$ ............................................. B62D 1/16
[52] U.S. Cl. ...................................... 74/492; 180/78; 280/777
[58] Field of Search ........................... 74/492; 180/78; 280/777

[56] References Cited

U.S. PATENT DOCUMENTS

| | | | |
|---|---|---|---|
| 2,548,244 | 4/1951 | Stein | 74/492 |
| 3,028,766 | 10/1962 | Musilli | 74/492 |
| 3,329,040 | 7/1967 | Stein | 74/493 |
| 3,556,549 | 1/1971 | Hershman et al. | 280/775 |
| 3,556,550 | 1/1971 | Franchini | 280/777 |
| 3,613,477 | 10/1971 | Heise | 74/493 |
| 3,678,777 | 7/1972 | Olsen | 74/492 |
| 3,922,928 | 12/1975 | Kester | 74/492 |
| 3,923,319 | 12/1975 | Nonaka et al. | 280/777 |
| 3,934,896 | 1/1976 | Barenyi | 280/777 |
| 4,411,167 | 10/1983 | Mohr | 280/777 |

FOREIGN PATENT DOCUMENTS 1412398 11/1975 United Kingdom ................. 74/492

Primary Examiner—Leslie Braun
Assistant Examiner—Anchell, Scott
Attorney, Agent, or Firm—Jerome R. Drouillard; Roger L. May

[57] ABSTRACT

An articulated steering driveshaft for an automotive vehicle includes first and second shaft segments coupled by a selectively foldable joint with the joint comprising a hinge for joining the shaft segments for rotation about an axis perpendicular to the axis of the shafts, and a sleeve slidably mounted upon the shaft segments and the hinge, with the sleeve being movable from a first position in which the sleeve extends axially over substantially the entirety of the hinge, to a second position in which the sleeve extends over a lesser portion of the hinge, with these positions being further characterized in that while occupying the first position the sleeve is adapted to transmit steering torque from one of the shaft segments to the other of the segments while maintaining the segments in a co-axial alignment, whereas while occupying the second position the sleeve allows the shaft segments to fold with respect to each other about the axis of the hinge.

13 Claims, 4 Drawing Sheets

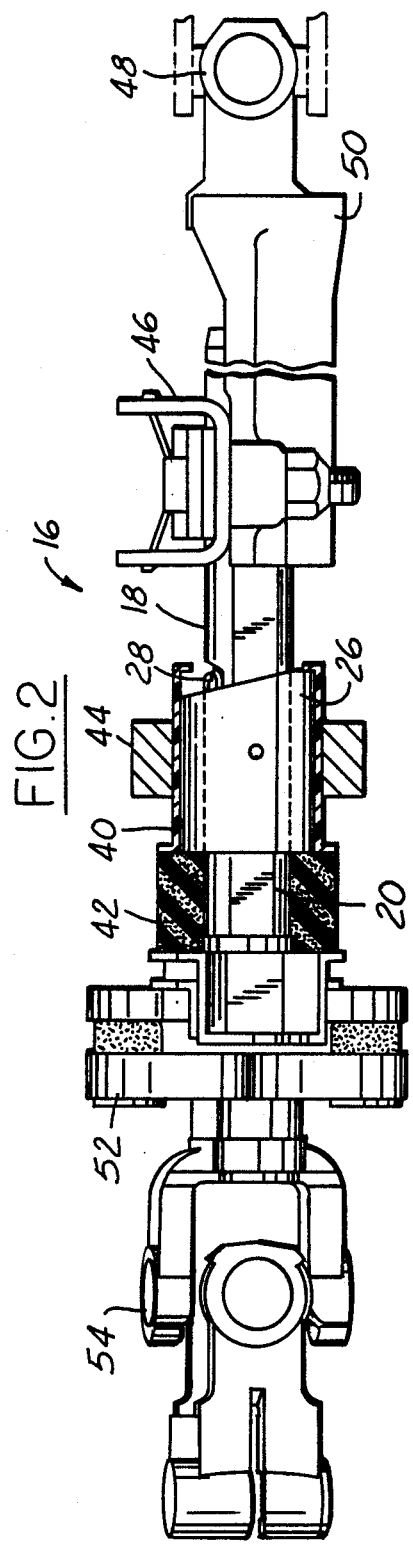
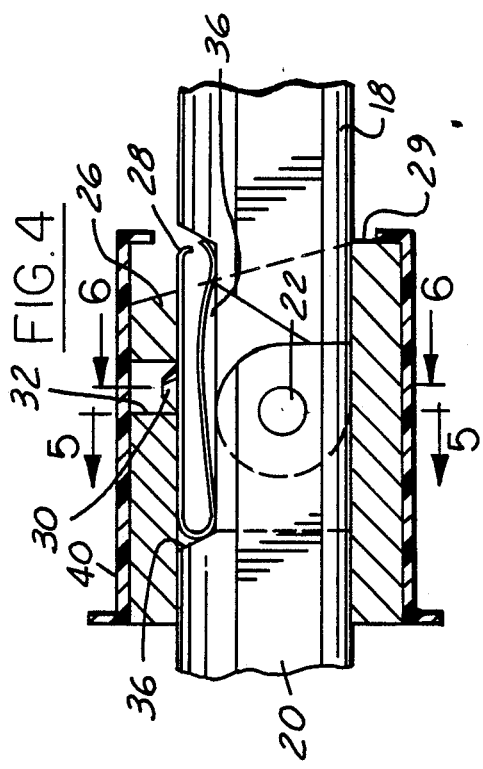
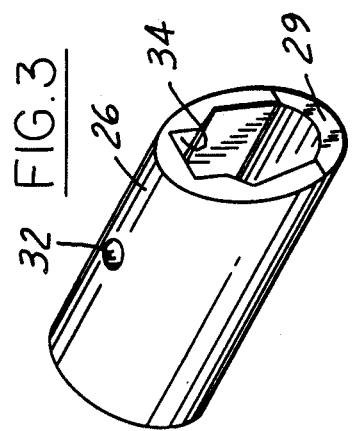

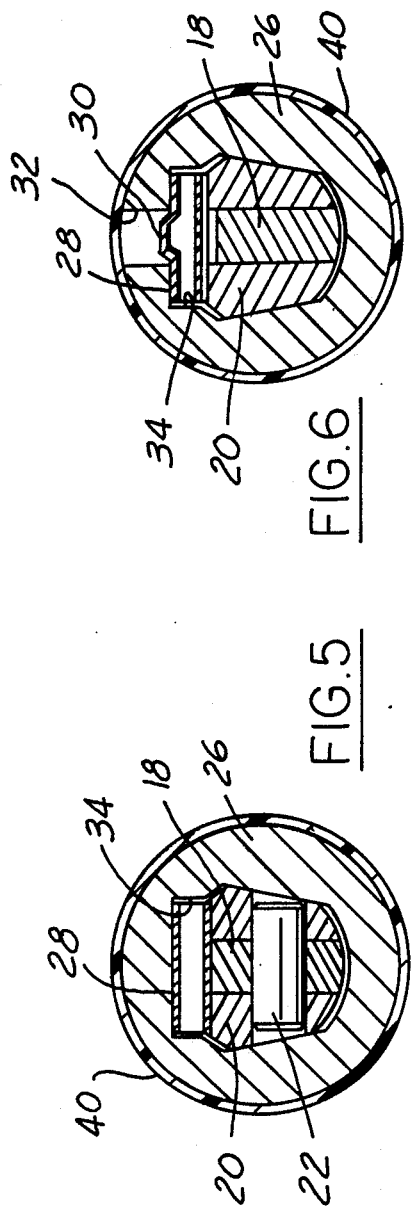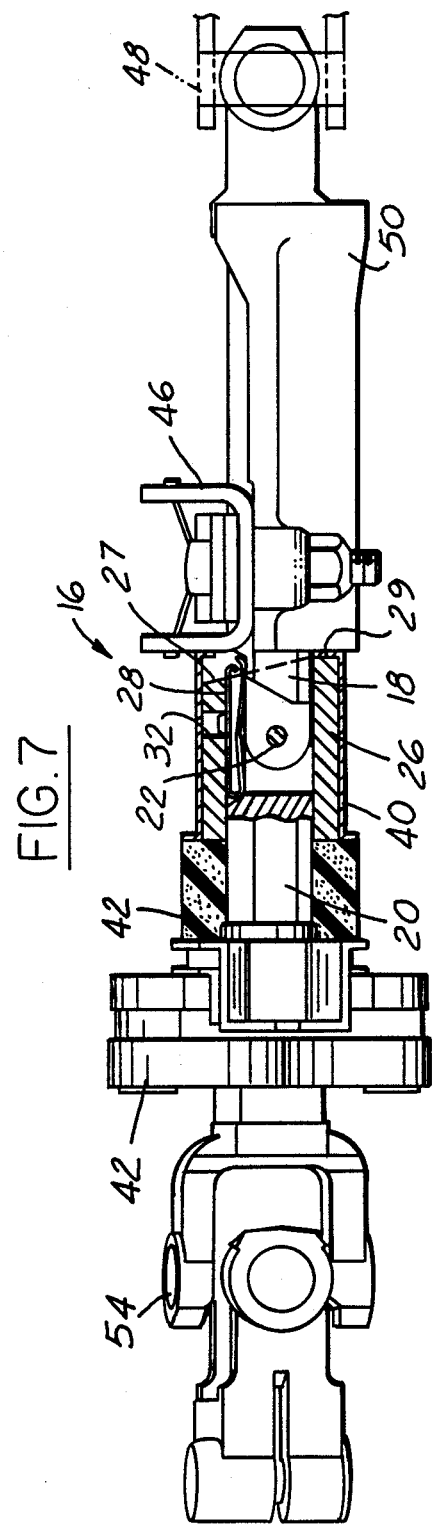

ARTICULATED STEERING DRIVESHAFT

BACKGROUND OF THE INVENTION

This invention relates to an articulated steering driveshaft for connecting a steering column to a steering gear assembly.

DISCLOSURE INFORMATION

The design and placement of steering driveshafts presents a peculiar design problem to the automotive engineer because such driveshafts, which are mounted between the steering column and the steering gear of the vehicle, must be capable of transmitting steering torques which can be of considerable magnitude in the event that power assist is lost from a power steering unit. In order to assure satisfaction of this requirement, steering driveshaft assemblies may be subjected to durability cycle testing torques in the range of 150 lbs.-ft. This necessitates that all torque transmitting subsystems in the driveshaft be of robust constitution so as to transmit such torques without failure and without excessive vibration or backlash. A second functional requirement affecting certain steering driveshafts is the requirement that the driveshaft be capable of folding or otherwise collapsing in the event that the vehicle is involved in a collision. Such folding may be required because of the particular structure of the vehicle, in order to assure that the steering wheel and other parts of the steering column do not needlessly endanger the vehicle driver during a collision which displaces the steering gear rearwardly with respect to the driver. Accordingly, on one hand, the steering column must be quite rigid so as to transmit turning torque faithfully and without needless vibration, while at the same time providing a joint which will allow the driveshaft to fold in the event of a collision which pushes the steering gear rearwardly. A steering driveshaft according to the present invention employs a sliding sleeve and hinge combination to provide a vibration resistant joint which is foldable in the event the steering shaft telescopes during a collision.

Automotive designers have long recognized the need for using different types of folding steering columns and driveshafts. U.S. Pat. Nos. 3,028,766; 3,934,896; and 3,923,319 disclose three examples of such folding steering columns. None of these disclosures illustrates a folding intermediate shaft in which a sleeve is used both for transmitting torque and for immobilizing a hinged joint until such time as the sleeve is forcibly moved axially from the joint due to the action of another component part of the steering driveshaft.

U.S. Pat. Nos. 3,329,040; 3,556,550; 3,613,477; and 3,556,549 illustrate steering column and driveshaft arrangements in which the hinged joint of a steering driveshaft is immobilized by a sleeve which does not transmit the steering torque. Such arrangements are disadvantageous inasmuch as they rely upon the hinged joint to transmit steering torques and as a result, excessive backlash or sloppiness may occur unless the hinged joint is made relatively massive, in which case the size and weight of the joint including the sleeve would be excessive.

It is an object of the present invention to provide an articulated steering driveshaft having a hinge for joining two or more segments of the driveshaft, with the hinge being immobilize by a sleeve which provides not only an immobilization function but which also serves to transmit steering torque between the adjacent shaft segments.

It is an advantage of the present invention that an articulated steering driveshaft according to this invention will faithfully transmit steering torque without undesirable backlash or sloppiness while at the same time permitting the driveshaft to fold out of the way in the event that the shaft is contracted telescopically during a collision.

Other objects, features and advantages of the present invention will become apparent to those skilled in the art in view of this disclosure.

SUMMARY OF THE DISCLOSURE

In accordance with the present invention, an articulated steering driveshaft for an automotive vehicle comprises first and second shaft segments coupled by means of a selectively foldable joint, with the joint comprising a hinge for joining the shaft segments for rotation about an axis perpendicular to the axes of the shafts and a sleeve slidably mounted upon the shaft segments and the hinge. The sleeve is movable from a first position in which the sleeve extends axially over substantially the entirety of the hinge to a second position in which the sleeve extends over a lesser portion of the hinge, with such positions being further characterized in that while occupying said first position said sleeve is adapted to transmit steering torque from one of the shaft segments to the other of the shaft segments, while maintaining the segments in coaxial alignment. When occupying the second position, the sleeve allows the shaft segments to fold with respect to each other about the hinge axis. A steering driveshaft according to this invention further comprises means for moving the previously described sleeve from the first position to the second position and for simultaneously urging the shaft segments into a folded position. The means for moving the sleeve from the first position to the second position may comprise a telescoping joint associated with the driveshaft, with one of said shaft segments comprising a mating part of the telescoping joint.

In order to transmit steering torque required to accomplish the principal function of the steering driveshaft, the sleeve preferably comprises an elongate body having a noncircular axial bore adapted to accept passage of the shaft segments and the hinge. The noncircular axial bore corresponds to the noncircular outer surfaces of said shafts. The sleeve is preferably retained in the first position by a retention means interposed between the sleeve and the shaft segments. This retention means may comprise a spring housed in the space defined by a relieved area formed in the shaft segments and further by the axial bore of the sleeve.

BRIEF DESCRIPTION OF THE DRAWINGS

FIG. 2 is an enlarged view of a steering driveshaft according to the present invention.

FIG. 3 is a perspective view of a sleeve embodying a portion of a joint used in the steering driveshaft according to the present invention.

FIG. 4 is an enlarged cutaway view of a portion of a selectively foldable joint included in a steering driveshaft according to the present invention.

FIG. 5 is a cross-sectional view of a selectively foldable joint according to the present invention, taken along the line 5—5 of FIG. 4.

FIG. 6 is a cross-sectional view of a selectively foldable joint according to the present invention, taken along the line 6—6 of FIG. 4.

FIG. 7 illustrates a driveshaft according to the present invention in a partially telescoped or contracted position.

DESCRIPTION OF THE PREFERRED EMBODIMENTS

Figure 1:
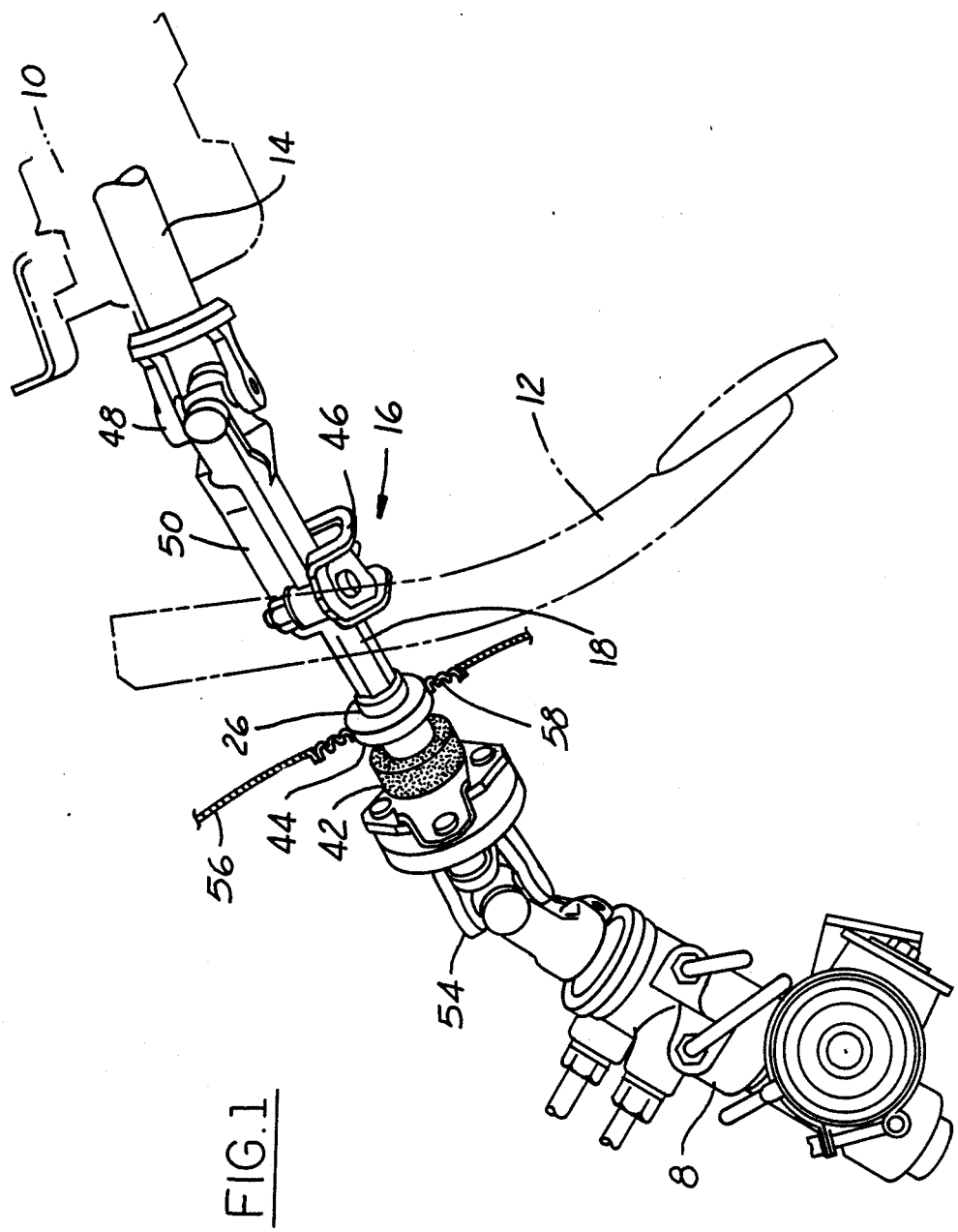
FIG. 1 is a perspective view of an automotive steering driveshaft which is interposed between a steering column and a steering gear of an automotive steering system.

As show in FIG. 1, an articulated intermediate steering driveshaft, 16, for an automotive vehicle according to the present invention, is intended to be mounted between a steering gear, 8, and upper driveshaft 14 within steering column 10. In conventional fashion, U-joints 48 and 54 are provided at the upper and lower extremes of the present driveshaft for the purpose of attaching same to upper driveshaft 14 housed within steering column 10 as well as to steering gear 8. As shown with particularity in FIG. 2, the driveshaft according to this invention may also include a flexible joint 52 which serves to damp vibrations transmitted from the steering gear to the steering driveshaft. Those skilled in the art will appreciate in view of this disclosure, however, the choice regarding the particular design of U-joints 48 and 54 as well as the decision to employ a flexible joint such as joint 52 lies within the jurisdiction of the individual steering system designer, it being understood that these and other details are optional as regarding employment of the present invention.

As noted above, a steering driveshaft according to the present invention is intended to provide a robust transmission member for steering torque having capability of being folded away after the occurrence of appropriate events. It has been determined that a driveshaft according to this invention is capable of transmitting torques in the region of 150 lbs.-ft. with shaft segments having a diameter of approximately ⅝ inches. Those skilled in the art will appreciate in view of this disclosure that the hinged shaft segments and articulating sleeve according to the present invention could be fabricated from many types of materials including ferrous and non-ferrous metals, plastic composite materials, and yet other types of materials. Merely by way of example, it has been found convenient to manufacture the shaft segments of mild steel, with the sleeve being fabricated of powdered metal.

As shown in the Figures, the capability of transmitting torque while selectively permitting a driveshaft according to this invention to fold is provided through the use of a sleeve, 26, which is slidably positioned over first shaft segment, 18, and second shaft segment, 20. Hinge pin 22 is used to join the first and second shaft segments so that the segments are able to rotate about the axis of the pin, with the axis of the pin being perpendicular to the axes of the shaft segments. Because sleeve 26 has a noncircular bore therethrough which matches the noncircular cross section or outer surfaces of first shaft segment 18 and second shaft segment 20, sleeve 26 is thereby adapted to transmit steering torque from one of the shaft segments to the other while maintaining the shaft segments in coaxial alignment. The fact that sleeve 26, and not hinge pin 22, is employed for transmitting steering torque between the first and second shaft segments is important because this assures that steering torque will be transmitted efficiently without allowing relative rotation of one shaft segment with respect to the other about their longitudinal axes.

Sleeve 26 is retained upon the first and second shaft segments by means of retainer spring 28, which occupies a space defined by relieved area 34 of sleeve 26 and an opposing relieved area 36 formed in shaft segments 18 and 20. (FIG. 4). The retainer spring, although shown as a folded leaf spring, illustrates but one possibility from a class of similar retaining devices. In any event, the function of the retainer is to maintain the sleeve in its proper position over the hinged section of the first and second shaft segments during normal operation of the vehicle. As shown in FIGS. 4–6, retainer spring 28 maintains the noncircular bore of sleeve 26 in contact with the first and second shaft segments so that a vibration free joint is maintained during normal operation of the shaft. FIGS. 4 and 6 show that retainer spring 28 includes a raised button, 30, which moves into retainer port 32 of sleeve 26, so as to lock sleeve 26 and retainer spring 28 together.

In addition to maintaining the first and second shaft segments coaxially aligned (i.e., in the unfolded or straight position), while transmitting steering torque between the shaft segments during normal operation of the vehicle, sleeve 26 of the present selectively foldable joint also serves as a mounting structure for bearing 44 (FIG. 2) which functions as an interface between a driveshaft according to the present invention and the dash panel structure of the vehicle. Bearing 44 is intended to allow rotation of the steering driveshaft with respect to boot seal 58 or other sealing element mounted securely to dash panel 56 of the vehicle (FIG. 1). Those skilled in the art will appreciate in view of this disclosure that bearing 44 could additionally perform a load supporting function. It will be further appreciated in view of this disclosure that bearing 44 could be chosen from a variety of commonly known bearing classes such as ball or roller or yet other types of antifriction bearings, or from various classes of plain bearings made from a variety of materials such as plastics, metals, or composites. It has been determined that a useful bearing may comprise a plastic annulus, within a plastic housing, with the annulus having a seal for engaging plastic sleeve 40 which overlies sleeve 26.

FIG. 2 shows further that a shaft according to the present invention includes an elastomeric annulus, 42, which serves as an environmental seal to exclude road contamination and noise from the passenger compartment of the vehicle. This seal abuts plastic sleeve 40 which is interposed between sleeve 26 and bearing 44.

Figure 8:
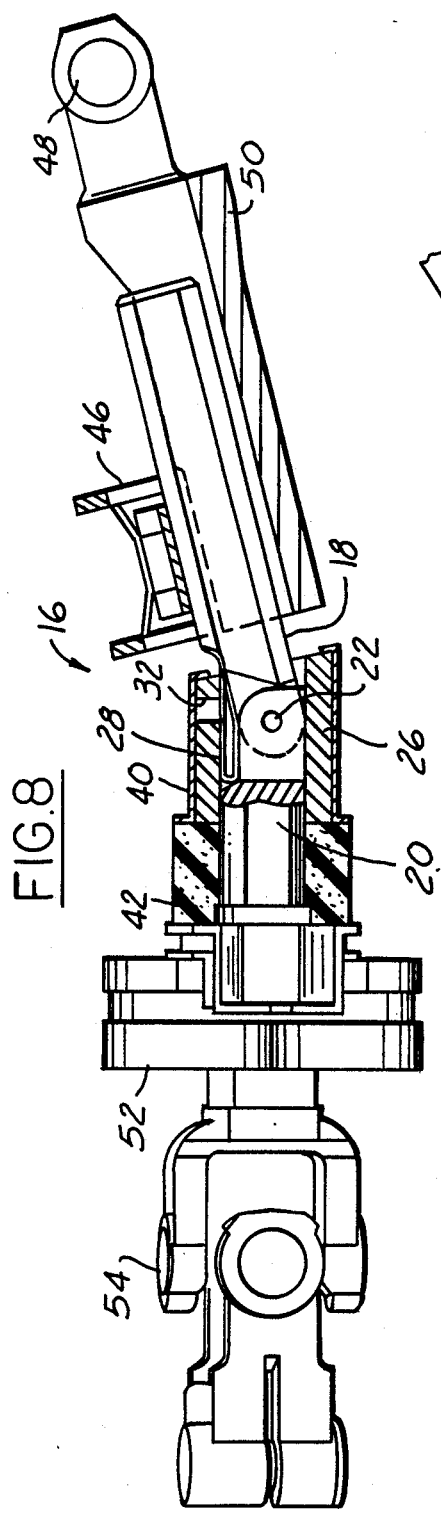
FIG. 8 illustrates a steering driveshaft according to the present invention in a telescoped and partially folded position.
Figure 9:
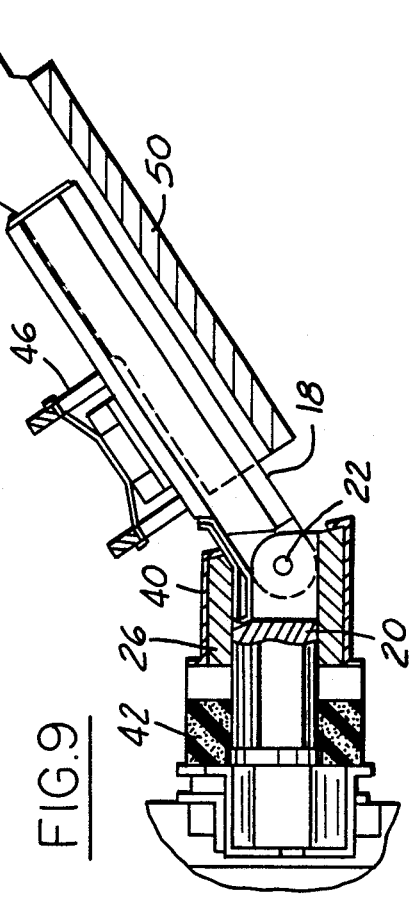
FIG. 9 illustrates a steering driveshaft according to the present invention in a fully telescoped and folded position.

FIG. 7 illustrates a driveshaft according to the present invention which has collapsed telescopically to the point at which channel structure 50, which serves as an actuator means for operating the folding joint, has moved into axial abutment with sleeve 26. As may be seen in FIG. 7, because sleeve 26 has a generally diagonal end, 27, which abuts channel structure 50, the channel structure will first contact sleeve 26 upon only contact face 29 (FIGS. 3–4). As a result, the force imposed upon sleeve 26 at contact face 29 by channel structure 50 will not only cause sleeve 26 to slide away from hinge pin 22 but will also cause the driveshaft to fold as shown in FIGS. 8 and 9. This folding action may be controlled by offsetting hinge pin 22 from the centerline of the shaft segments so that the folding joint will be allowed to articulate in only one direction.

FIGS. 8 and 9 detect a driveshaft according to the present invention in two separate telescoped and folded positions.

Channel structure 50 has a noncircular cross-sectional relieved area in which first shaft segment 18 is slidably housed. Because the channel structure is open on one side, clamp 46 is required to maintain engagement of first shaft segment 18 and channel structure 50. As may be seen from FIGS. 1-2, and 7-8, channel structure 50 is integral with one half of the mating portion of U-joint 48. Those skilled in the art will appreciate in view of this disclosure that the noncircular cross section of the first and second shaft segments and the corresponding noncircular cross sections of sleeve 26 and channel structure 50 could comprise not only the cross section illustrated in FIGS. 3, 5 and 6, but, alternatively, these cross sections could be formed as splined circular sections or other types of sliding and torque transmitting configurations known to those skilled in the art and suggested by this disclosure.

As may be seen in FIGS. 8 and 9, as a driveshaft according to the present invention telescopes and folds, sleeve 26 bears axially upon elastomeric annulus 42, compressing the annulus between the sleeve itself and flexible joint 52. As the sleeve moves axially in the direction of flexible joint 52, the hinged joint is progressively allowed to fold about the axis of pin 22. This folding action is accompanied by deformation of retainer spring 28 because the spring retainer will remain in approximately the same position relative to the first and second shaft segments. As may be seen from FIG. 9, as sleeve 26 moves into close proximity of flexible joint 52, further folding of the hinged joint about pin 22 will cause additional axial displacement of sleeve 26 in the direction of flexible joint 52. When this occurs, the folding action of the shaft segments may subject the spring to bending stresses which it is not able to accommodate.

Various modifications and variations will no doubt occur to those skilled in the various arts to which this invention pertains. All variations which basically rely on the teachings by which this disclosure has advanced the art are properly considered within the scope of this invention, as defined by the appended claims.

I claim:

1. An articulated steering driveshaft for an automotive vehicle, comprising:
    first and second shaft segments coupled by means of a selectively foldable joint, with said joint comprising:
    a hinge for joining said shaft segments for rotation about an axis perpendicular to the axes of said shafts; and
    a sleeve slidably mounted upon said shaft segments and said hinge, with said sleeve being movable from a first position in which said sleeve extends axially over substantially the entirety of said hinge to a second position in which said sleeve extends over a lesser portion of said hinge, with said positions being further characterized such that while occupying said first position said sleeve is adapted to transmit steering torque from one of said shaft segments to the other of said segments while maintaining said segments in coaxial alignment, whereas while occupying said second position said sleeve allows said shaft segments to fold with respect to each other about the axis of said hinge.

2. A steering driveshaft according to claim 1 further comprising means for moving said sleeve from said first position to said second position and for simultaneously urging said shaft segments into a folded position.

3. A steering driveshaft according to claim 1 further comprising means for moving said sleeve from said first position to said second position.

4. A steering driveshaft according to claim 3 wherein said means for moving said sleeve comprises a telescoping joint associated with said driveshaft.

5. A steering driveshaft according to claim 4 wherein one of said shaft segments comprises a mating part of said telescoping joint.

6. A steering driveshaft according to claim 1 wherein said sleeve comprises an elongated body having a noncircular axial bore adapted to accept passage of said shaft segments and said hinge.

7. A steering driveshaft according to claim 6 wherein said sleeve is retained in said first position by a retention means interposed between said sleeve and said shaft segments and said hinge.

8. A steering driveshaft according to claim 7 wherein said retention means comprises a spring housed in a space defined by a relieved area formed in said shaft segments and further by said axial bore of said sleeve.

9. An articulated steering driveshaft for an automotive vehicle, comprising;
    first and second shaft segments coupled by means of a selectively foldable joint, with said joint comprising:
    a hinge for joining said shaft segments for rotation about an axis perpendicular to the axes of said shafts;
    a sleeve slidably mounted upon said shafts and said hinge, with said sleeve being movable from a first position in which said sleeve extends axially over substantially the entirety of said hinge to a second position in which said sleeve extends over a portion of said hinge, with said positions being further characterized such that while occupying said first position said sleeve is adapted to maintain said segments in coaxial alignment, whereas while occupying said second position said sleeve allows said shaft segments to fold with respect to each other about said hinge;
    said driveshaft further comprising a telescoping joint adapted to move said sleeve from said first position to said second position.

10. A steering driveshaft according to claim 9 wherein said shaft segments each have a noncircular cross-sectional configuration which corresponds to the configuration of a longitudinal bore formed in said sleeve.

11. A steering system for an automotive vehicle, comprising:
    a steering gear;
    a steering column having an upper driveshaft journaled therein; and
    an intermediate driveshaft pivotally connected to said steering gear and to said upper driveshaft, with said intermediate driveshaft comprising:
    first and second shaft segments coupled by a selectively foldable joint, with said joint comprising a hinge for joining said shaft segments for rotation about a hinge axis perpendicular to the axes of said shafts and a sleeve slidably mounted upon said shafts and said hinge with said sleeve having a noncircular axial bore therethrough which corresponds to the noncircular outer surfaces of said shafts;

a first pivotable joint for connecting said first shaft segment with said upper driveshaft, with said joint further comprising telescoping joint means;

a second pivotable joint for connecting said second shaft segment with said steering gear; and actuator means associated with said telescoping joint means for operating said selectively foldable joint in response to axial contraction of said telescoping joint means, comprising means for displacing said sleeve from a first position in which said sleeve immobilizes said hinge to a second position in which said sleeve allows said shaft segments to rotate about said hinge axis.

12. A steering system according to claim 11, wherein said actuator means comprises a channel portion of said telescoping joint, which contacts said sleeve axially when said intermediate driveshaft contracts, thereby moving said sleeve to said second position.

13. A steering system according to claim 11, further comprising a bearing mounted between said sleeve and a seal secured to the dash panel of said vehicle, such that said intermediate driveshaft will be allowed to rotate with respect to said dash panel seal.

* * * * *